(12) United States Patent
Hou et al.

(10) Patent No.: US 10,903,742 B2
(45) Date of Patent: Jan. 26, 2021

(54) SWITCHED-CAPACITOR CONVERTER CIRCUIT, CHARGING CONTROL SYSTEM, AND CONTROL METHOD

(71) Applicant: HUAWEI TECHNOLOGIES CO., LTD., Guangdong (CN)

(72) Inventors: Qinghui Hou, Dongguan (CN); Cheng Yang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/851,423

(22) Filed: Apr. 17, 2020

(65) Prior Publication Data

US 2020/0244161 A1 Jul. 30, 2020

Related U.S. Application Data

(63) Continuation of application No. PCT/CN2018/110360, filed on Oct. 16, 2018.

(30) Foreign Application Priority Data

Oct. 19, 2017 (CN) .......................... 2017 1 0979677

(51) Int. Cl.
*H02M 3/07* (2006.01)
*H02M 3/158* (2006.01)
*H02M 3/137* (2006.01)

(52) U.S. Cl.
CPC ............. *H02M 3/07* (2013.01); *H02M 3/137* (2013.01); *H02M 3/1584* (2013.01)

(58) Field of Classification Search
CPC .. G05F 1/563; G05F 1/44; G05F 1/10; H02M 5/42; H02M 7/25; H02M 2007/4811;

(Continued)

(56) References Cited

U.S. PATENT DOCUMENTS 5,581,454 A * 12/1996 Collins ................... H02M 3/07
363/59
6,452,424 B1 * 9/2002 Shamlou .............. H03H 19/004
327/554

(Continued)

FOREIGN PATENT DOCUMENTS

CN 1047944 A 12/1990
CN 1409472 A 4/2003

(Continued)

*Primary Examiner* — Thienvu V Tran
*Assistant Examiner* — Nusrat Quddus
(74) *Attorney, Agent, or Firm* — Womble Bond Dickinson (US) LLP

(57) ABSTRACT

This application provides a switched-capacitor converter circuit, a charging control system, and a control method. In the switched-capacitor converter circuit, input terminals of N levels of switched-capacitor converter units are sequentially connected in series, and output terminals of the N levels of switched-capacitor converter units are connected in parallel, to obtain a first power supply branch to supply power to a load. In addition, a first capacitor acts as a second power supply branch to supply power to the load, and the first power supply branch and the second power supply branch transmit power in parallel. In comparison with a serial power transmission manner, there are fewer devices on a power transmission path when a parallel power transmission manner is used. Therefore, this can reduce power losses on the transmission path, and improve transmission efficiency of the switched converter circuit.

14 Claims, 10 Drawing Sheets

(58) Field of Classification Search
CPC . H02M 2007/4815; H02M 2007/4818; H02M 2001/007; H02M 2001/0045; H02M 2001/003; H02M 2001/0058; H02M 2001/075; H02M 2003/072; H02M 2003/077; H02M 2003/076; H02M 1/42; H02M 1/4208; H02M 1/08; H02M 3/07; H02M 3/137; H02M 3/1584; H02M 3/156; H02M 3/158; H02M 3/1588; H02M 3/1582; H02M 3/335; H02M 3/33569; H02M 3/33546; H02M 3/33576; H02M 3/337; H02M 3/33507; H02M 3/3353; H02M 3/33523; H02M 3/33592; H02M 3/33553; H02M 3/33515; H02M 3/3546; H02M 3/33538

See application file for complete search history.

(56) References Cited

U.S. PATENT DOCUMENTS

| | | | |
|---|---|---|---|
| 7,696,735 B2 | 4/2010 | Oraw et al. | |
| 8,817,501 B1* | 8/2014 | Low | H02M 3/07 363/60 |
| 9,385,596 B1* | 7/2016 | Yang | G11O 5/145 |
| 9,831,776 B1* | 11/2017 | Jiang | H02M 1/15 |
| 10,734,921 B2* | 8/2020 | Arulandu | H02N 2/181 |
| 10,770,976 B2* | 9/2020 | Giuliano | H02M 3/33546 |
| 2004/0264223 A1* | 12/2004 | Pihlstrom | H02M 3/07 363/89 |
| 2012/0026027 A1* | 2/2012 | Steensgaard-Madsen | H03M 1/466 341/161 |
| 2013/0194031 A1* | 8/2013 | Poulton | H04L 25/0272 327/536 |
| 2013/0249727 A1* | 9/2013 | Hurrell | H03F 3/45 341/150 |
| 2014/0346962 A1* | 11/2014 | Sanders | H02M 3/33507 315/193 |
| 2016/0197552 A1* | 7/2016 | Giuliano | H02M 3/158 363/60 |
| 2016/0344214 A1 | 11/2016 | Petersen et al. | |
| 2017/0237276 A1 | 8/2017 | Onishi | |
| 2018/0198367 A1* | 7/2018 | Zhang | H02M 3/07 |
| 2018/0205315 A1* | 7/2018 | Giuliano | H02M 3/073 |
| 2018/0337594 A1* | 11/2018 | Zhang | H02M 3/158 |
| 2019/0058396 A1* | 2/2019 | Zhang | H02M 3/07 |
| 2019/0089258 A1* | 3/2019 | Giuliano | H02M 3/073 |
| 2019/0199214 A1* | 6/2019 | Zhao | H02M 3/07 |
| 2019/0199221 A1* | 6/2019 | Zhao | H02M 3/07 |
| 2019/0372457 A1* | 12/2019 | Zhang | H02M 3/1588 |
| 2020/0204072 A1* | 6/2020 | Yang | H02M 3/158 |

FOREIGN PATENT DOCUMENTS

| | | |
|---|---|---|
| CN | 1484366 A | 3/2004 |
| CN | 101083431 A | 12/2007 |
| CN | 101378054 A | 3/2009 |
| CN | 201262861 Y | 6/2009 |
| CN | 101894830 A | 11/2010 |
| CN | 104781745 A | 7/2015 |
| CN | 106685219 A | 5/2017 |
| CN | 206564475 U | 10/2017 |
| CN | 107834844 A | 3/2018 |
| FR | 3040113 A1 | 2/2017 |

* cited by examiner

10,903,742 B2

SWITCHED-CAPACITOR CONVERTER CIRCUIT, CHARGING CONTROL SYSTEM, AND CONTROL METHOD

CROSS-REFERENCE TO RELATED APPLICATIONS

This application is a continuation of International Application No. PCT/CN2018/110360, filed on Oct. 16, 2018, which claims priority to Chinese Patent Application No. 201710979677.8, filed on Oct. 19, 2017. The disclosures of the aforementioned applications are hereby incorporated by reference in their entireties.

TECHNICAL FIELD

The present application pertains to the field of power source technologies, and in particular, to a switched-capacitor converter circuit, and a charging control system and method.

BACKGROUND

In the field of mobile terminals, a limited size of a mobile terminal restricts a battery capacity in the mobile terminal. Therefore, short battery life of the mobile terminal becomes a problem to be resolved in the field. At present, fast charging has become a main approach to resolve the problem of short battery life. Fast charging, as its name suggests, means increasing a charging speed. Increasing a charging speed may be implemented from two perspectives: increasing a charging voltage and increasing a charging current. However, increasing a charging voltage increases heat generated in a charging process, accelerates battery aging, and may result in security risks, failing to achieve an expected effect in actuality. In comparison, increasing a charging current is more practical.

Increasing a charging current necessarily results in an ever-increasing charging power. For a conventional charging integrated circuit (a buck converter), to increase the charging power, a size of an inductor and an area of the charging integrated circuit need to be increased. However, the size of the mobile terminal is limited, and it is impossible to provide relatively large space for the charging integrated circuit. Therefore, the conventional charging integrated circuit is unworkable.

However, a switched capacitor converter uses a capacitor as an energy storage element. Therefore, a size of the switched capacitor converter is greatly reduced in comparison with a size of a switched-inductor converter. Therefore, the switched capacitor converter is an optimal choice. However, as a charging current (namely, an output current of the switched capacitor converter) increases, for example, if the charging current increases to 8 A or above, an input current of the switched capacitor converter exceeds 5 A, and a voltage gain of the switched capacitor converter needs to be further increased.

FIG. 1 is a schematic principle diagram of a circuit of a conventional 3:1 type switched capacitor converter. The 3:1 type switched capacitor converter is obtained by adding two serially connected switching transistors to a typical 2:1 type switched capacitor conversion topology. As shown in FIG. 1, Q12, Q22, Q13, Q23, C1, and Co form the typical 2:1 type switched capacitor conversion topology. Compared with the 2:1 type switched capacitor conversion topology, the 3:1 type switched capacitor conversion topology has two additional serially connected switching transistors, and losses of a power input from an input Vin are generated on the two switching transistors. Therefore the 3:1 type switched capacitor conversion topology has lower conversion efficiency than the 2:1 type switched capacitor conversion topology. To be specific, the conventional 3:1 type switched capacitor converter transmits power serially, resulting in an increase of losses in the switched capacitor converter, and further resulting in an increase in heat dissipation temperature of the switched capacitor converter. As a result, heat dissipation temperature of the mobile terminal increases.

SUMMARY

In view of this, the present application provides a switched-capacitor converter circuit, and a charging control system and method, to increase a voltage gain conversion ratio of a switched capacitor converter whose voltage gain ratio is 2:1, so as to improve conversion efficiency without increasing overall losses. A specific technical solution thereof is as follows.

According to a first aspect, this application provides a switched-capacitor converter circuit, including a first capacitor and N levels of switched-capacitor converter units, where N is an integer greater than or equal to 1. Input terminals of the N levels of switched-capacitor converter units are connected in series, and output terminals of the N levels of switched-capacitor converter units are connected in parallel, to form a first power supply branch to supply power to a load. A second input terminal of each level of switched-capacitor converter unit is connected to a first input terminal of a next level of switched-capacitor converter unit, and an output terminal of each level of switched-capacitor converter unit is connected to the load. A first input terminal of a first level of switched-capacitor converter unit is configured to input a first voltage signal, where the first voltage signal is an input voltage Vin of the switched-capacitor converter circuit. A second input terminal of an $N^{th}$ level of switched-capacitor converter unit is configured to connect to a positive electrode of the first capacitor, and a negative electrode of the first capacitor is connected to a ground terminal. The positive electrode of the first capacitor is further connected to a positive electrode of the load, to form a second power supply branch to supply power to the load, and the first power supply branch and the second power supply branch are connected in parallel. Each level of switched-capacitor converter unit includes a capacitor isolation unit and a switched-capacitor topology. A first terminal of the capacitor isolation unit is a first input terminal of the switched-capacitor converter unit. A second terminal of the capacitor isolation unit is a second input terminal of the switched-capacitor converter unit. An output terminal of the capacitor isolation unit is connected to an input terminal of the switched-capacitor topology. An output terminal of the switched-capacitor topology is an output terminal of the switched-capacitor converter unit. The capacitor isolation unit is configured to isolate the first voltage from the switched-capacitor topology. An input-output voltage ratio of the switched-capacitor topology is 2:1, so that an input-output voltage average ratio of each level of switched-capacitor converter unit is 2:1. The output terminal of each level of switched-capacitor converter unit and the positive electrode of the first capacitor are connected in parallel to act as an output terminal of the switched-capacitor converter circuit. An output voltage of the switched-capacitor converter circuit is Vout. Input terminals of the levels of switched-capacitor converter units are sequentially connected in series. A resulted voltage when the levels of switched-capacitor converter units are serially connected and then serially connected to the first capacitor is the input voltage Vin of the switched-capacitor converter circuit, where Vin is equal to (2N+1)Vout.

In the switched-capacitor converter circuit provided in the first aspect, the first power supply branch obtained by combining the N levels of switched-capacitor converter units and the second power supply branch formed by the first capacitor transmit power in parallel. There are relatively few devices on a power transmission path in the parallel power transmission manner. Therefore, power losses on the transmission path are reduced. In addition, the first capacitor directly charges the load without using any switching transistor, and there are no switching transistor losses on the charging branch, thereby further improving transmission efficiency of the switched converter.

In one embodiment, the capacitor isolation unit includes a first switching transistor, a second switching transistor, a third switching transistor, and a second capacitor. A first terminal of the first switching transistor is the first terminal of the capacitor isolation unit, a second terminal of the first switching transistor is connected to a positive electrode of the second capacitor, the positive electrode of the second capacitor is the output terminal of the capacitor isolation unit, and a negative electrode of the second capacitor is connected to a first terminal of the third switching transistor. A first terminal of the second switching transistor is the second terminal of the capacitor isolation unit, a second terminal of the second switching transistor is connected to a common terminal of the third switching transistor and the second capacitor, and a second terminal of the third switching transistor is connected to the ground terminal. Control terminals of the first switching transistor and the second switching transistor receive a first control signal, a control terminal of the third switching transistor receives a second control signal, duty cycles of both the first control signal and the second control signal are preset ratios, and waveforms of the first control signal and the second control signal complement each other.

In another embodiment, the switched-capacitor topology includes a fourth switching transistor, a fifth switching transistor, a sixth switching transistor, a seventh switching transistor, a third capacitor, and a fourth capacitor. A first terminal of the fourth switching transistor is the input terminal of the switched-capacitor topology, a second terminal of the fourth switching transistor is connected to a first terminal of the fifth switching transistor, a second terminal of the fifth switching transistor is connected to a positive electrode of the fourth capacitor, a negative electrode of the fourth capacitor is connected to the ground terminal, and a positive electrode of the fourth capacitor is the output terminal of the switched-capacitor topology. A positive electrode of the third capacitor is connected to a common terminal of the fourth switching transistor and the fifth switching transistor, a negative electrode of the third capacitor is connected to a first terminal of the sixth switching transistor, and a second terminal of the sixth switching transistor is connected to the ground terminal. A first terminal of the seventh switching transistor is connected to a common terminal of the third capacitor and the sixth switching transistor, and a second terminal of the seventh switching transistor is connected to a second terminal of the fifth switching transistor. Control terminals of the fourth switching transistor and the seventh switching transistor receive the second control signal, control terminals of the fifth switching transistor and the sixth switching transistor receive the first control signal, and waveforms of the first control signal and the second control signal complement each other.

In still another embodiment, the switched-capacitor converter circuit further includes an output inductor. One terminal of the output inductor is connected to the output terminal of the switched-capacitor topology, and the other terminal of the output inductor is connected to the positive electrode of the load.

The output inductor added to the switched-capacitor converter circuit provided in this implementation is resonant with a third capacitor in the switched-capacitor topology or soft switching is implemented, thereby reducing switching losses in the switched-capacitor topology, and further reducing switching losses of the entire switched-capacitor converter circuit.

In yet another embodiment, the switched-capacitor converter circuit further includes an input inductor connected to the first terminal of the capacitor isolation unit, and the input inductor is resonant with the first capacitor and the second capacitor.

The input inductor is added to the switched-capacitor converter circuit provided in this implementation. The input inductor is resonant with the first capacitor and the second capacitor, so that the first switching transistor and the second switching transistor in the capacitor isolation unit support soft switching, thereby reducing switching losses in the capacitor isolation unit, and further reducing switching losses of the entire switched-capacitor converter circuit.

According to a second aspect, this application further provides a charging control system of a rechargeable battery, applied to a mobile terminal. The charging control system includes the switched-capacitor converter circuit in any of the implementations of the first aspect, and a charging integrated circuit including a buck circuit. The load is a rechargeable battery. An input terminal of the charging integrated circuit is configured to input the first voltage, a first output terminal of the charging integrated circuit is configured to connect to a positive electrode of the rechargeable battery, and a second output terminal of the charging integrated circuit is configured to connect to another circuit in the mobile terminal, where the another circuit is a circuit in the mobile terminal that needs power supply, except for the rechargeable battery. When the rechargeable battery is in a constant current charging mode, or when a charging current of the rechargeable battery is less than a preset current value, the switched-capacitor converter circuit is controlled to supply power to the rechargeable battery; or when the rechargeable battery is in a constant voltage charging mode, or when a charging current of the rechargeable battery is greater than or equal to the preset current value, the charging integrated circuit is controlled to supply power to the rechargeable battery.

In the charging control system provided in the second aspect, the conventional charging integrated circuit is used to collaboratively work with the switched-capacitor converter circuit, so that a change of the charging control system is relatively small. In such a charging control system, when a large current is required to charge the rechargeable battery, the switched-capacitor converter circuit with a large charging power and small power consumption is used to charge the rechargeable battery, thereby increasing a charging speed without increasing power consumption.

In one embodiment, the charging control system further includes an eighth switching transistor. A first terminal of the eighth switching transistor is connected to a positive electrode of a voltage source, a second terminal of the eighth switching transistor is connected to the first terminal of the capacitor isolation unit, and the voltage source outputs the first voltage. The added eighth switching transistor in this implementation can prevent battery current backflow.

According to a third aspect, this application further provides another charging control system of a rechargeable battery. The charging control system is applied to a mobile terminal, and includes a charging mode control module and the switched-capacitor converter circuit in any of the implementations of the first aspect. The load is a rechargeable battery. An output terminal of the switched-capacitor converter circuit is further connected to another circuit in the mobile terminal, where the another circuit is a circuit in the mobile terminal that needs power supply, except for the rechargeable battery. The charging mode control module includes a first detection terminal, a second detection terminal, a third detection terminal, a first output terminal, and a second output terminal, where the first detection terminal is configured to detect the output voltage of the switched-capacitor converter circuit, the second detection terminal is configured to detect a charging current of the rechargeable battery, and the third detection terminal is configured to detect a voltage of the rechargeable battery. The first output terminal is connected to a control terminal of a type-1 switching transistor in the switched-capacitor converter circuit, and the second output terminal is connected to a control terminal of a type-2 switching transistor of the switched capacitor circuit, where the type-1 switching transistor includes the first switching transistor, the second switching transistor, the fifth switching transistor, and the sixth switching transistor, and the type-2 switching transistor includes the third switching transistor, the fourth switching transistor, and the seventh switching transistor. The charging mode control module is configured to: when detecting, in a constant current charging mode, that the charging current of the rechargeable battery is less than a current threshold, or when detecting, in a constant voltage charging mode, the output voltage of the switched-capacitor converter circuit is less than a voltage threshold, or when detecting, in a trickle charging mode, that the voltage of the rechargeable battery is less than a voltage threshold, output the first control signal through the first output terminal of the charging mode control module, and output the second control signal through the second output terminal of the charging mode control module, to make the switched-capacitor converter circuit work. Alternatively, the charging mode control module is configured to: when detecting, in a constant current charging mode, that the charging current of the rechargeable battery is greater than or equal to the current threshold, or when detecting, in a constant voltage charging mode, that the output voltage of the switched-capacitor converter circuit is greater than or equal to the voltage threshold, or when detecting, in a trickle charging mode, that the voltage of the rechargeable battery is greater than or equal to the voltage threshold, disable the first control signal and the second control signal.

In the charging control system provided in the third aspect, the charging mode control module is used to implement closed control over the rechargeable battery. During the entire control process, the switched-capacitor converter circuit is used to charge the rechargeable battery. Therefore, a charging integrated circuit is not required, thereby reducing system complexity and also reducing system costs.

According to a fourth aspect, this application provides a charging control method for a rechargeable battery, applied to a charging control system of a rechargeable battery. The charging control system of a rechargeable battery includes the switched-capacitor converter circuit in any of the implementations of the first aspect, and a charging integrated circuit including a buck circuit. The load is a rechargeable battery. An input terminal of the charging integrated circuit is configured to input the first voltage, a first output terminal of the charging integrated circuit is configured to connect to a positive electrode of the rechargeable battery, and a second output terminal of the charging integrated circuit is configured to connect to another circuit in the mobile terminal, where the another circuit is a circuit in the mobile terminal that needs power supply, except for the rechargeable battery. The method includes:

when the rechargeable battery is in a constant current charging mode, or when a charging current of the rechargeable battery is less than a preset current value, controlling the switched-capacitor converter circuit to supply power to the rechargeable battery; or when the rechargeable battery is in a constant voltage charging mode, or when a charging current of the rechargeable battery is greater than or equal to the preset current value, controlling the charging integrated circuit to supply power to the rechargeable battery.

According to the charging control method provided in the fourth aspect, when a small current is required, the charging integrated circuit works but the switched-capacitor converter circuit does not work; or when a large current is required, the switched-capacitor converter circuit charges the rechargeable battery, and the charging integrated circuit supplies power to the another circuit in the mobile terminal. The conventional charging integrated circuit is used to collaboratively work with the switched-capacitor converter circuit, so that a change of the charging control system is relatively small. In such a charging control system, when a large current is required to charge the rechargeable battery, the switched-capacitor converter circuit with a large charging power and small power consumption is used to charge the rechargeable battery, thereby increasing a charging speed without increasing power consumption.

According to a fifth aspect, this application provides another charging control method for a rechargeable battery, applied to a charging control system of a rechargeable battery. The charging control system of a rechargeable battery includes a charging mode control module and the switched-capacitor converter circuit in any of the implementations of the first aspect. The load is a rechargeable battery. The output terminal of the switched-capacitor converter circuit is further connected to another circuit in the mobile terminal, where the another circuit is a circuit in the mobile terminal that needs power supply, except for the rechargeable battery. The charging mode control module includes a first detection terminal, a second detection terminal, a third detection terminal, a first output terminal, and a second output terminal, where the first detection terminal is configured to detect the output voltage of the switched-capacitor converter circuit, the second detection terminal is configured to detect a charging current of the rechargeable battery, and the third detection terminal is configured to detect a voltage of the rechargeable battery. The first output terminal is connected to a control terminal of a type-1 switching transistor in the switched-capacitor converter circuit, and the second output terminal is connected to a control terminal of a type-2 switching transistor of the switched capacitor circuit, where the type-1 switching transistor includes the first switching transistor, the second switching transistor, the fifth switching transistor, and the sixth switching transistor, and the type-2 switching transistor includes the third switching transistor, the fourth switching transistor, and the seventh switching transistor. The method includes:

when detecting, in a constant current charging mode, that the charging current of the rechargeable battery is less than a current threshold, or when detecting, in a constant voltage charging mode, the output voltage of the switched-capacitor converter circuit is less than a voltage threshold, or when detecting, in a trickle charging mode, that the voltage of the rechargeable battery is less than a voltage threshold, outputting the first control signal through the first output terminal of the charging mode control module, and outputting the second control signal through the second output terminal of the charging mode control module, to make the switched-capacitor converter circuit work; or when detecting, in a constant current charging mode, that the charging current of the rechargeable battery is greater than or equal to the current threshold, or when detecting, in a constant voltage charging mode, that the output voltage of the switched-capacitor converter circuit is greater than or equal to the voltage threshold, or when detecting, in a trickle charging mode, that the voltage of the rechargeable battery is greater than or equal to the voltage threshold, disabling the first control signal and the second control signal.

According to the charging control method provided in the fifth aspect, the charging mode control module is used to implement closed control over the rechargeable battery. During the entire control process, the switched-capacitor converter circuit is used to charge the rechargeable battery. Therefore, a charging integrated circuit is not required, thereby reducing system complexity and also reducing system costs.

The switched-capacitor converter circuit provided in this application includes the first capacitor and the N levels of switched-capacitor converter units. Input terminals of the N levels of switched-capacitor converter units are sequentially connected in series, and the output terminals of the N levels of switched-capacitor converter units are connected in parallel to connect to the load, to obtain the first power supply branch that supplies power to the load. The positive electrode of the first capacitor is further connected to the positive electrode of the load, to form the second power supply branch that supplies power to the load. The first power supply branch and the second power supply branch transmit power in parallel to the load. Specifically, each level of switched-capacitor converter unit includes the capacitor isolation unit and the switched-capacitor topology. The capacitor isolation unit is configured to isolate the input terminal of the entire switched-capacitor converter circuit from the switched-capacitor topology. An input-output voltage ratio of the switched-capacitor topology is 2:1, that is, an input-output voltage ratio of the switched-capacitor converter unit is 2:1. The output terminal of each level of the switched-capacitor converter unit is connected to the load in parallel. To be specific, both an output voltage of each switched-capacitor converter unit and an output voltage of the first capacitor are the output voltage Vout of the entire switched-capacitor converter circuit. The input terminals of all the levels of switched-capacitor converter units are sequentially connected in series, and then are serially connected to the first capacitor to obtain a serial branch. Because the input-output voltage ratio of the switched-capacitor converter unit is 2:1, an input voltage of each level of switched-capacitor converter unit is 2Vout. Therefore, a voltage of the serial branch that is obtained by sequentially connecting the input terminals of the N switched-capacitor converter units and then serially connecting to the first capacitor is equal to (2N+1)Vout. The voltage of the serial branch is the input voltage Vin of the entire switched-capacitor converter circuit. In other words, the input-output voltage ratio of the entire switched-capacitor converter circuit is (2N+1):1. In conclusion, it can be learned that, the N levels of switched-capacitor converter units are combined to act as a power supply branch to supply power to the load. In addition, the first capacitor acts as another power supply branch to supply power to the load. The two power supply branches transmit power in parallel. In comparison with a serial power transmission manner, there are relatively few devices on a power transmission path in the parallel power transmission manner. Therefore, this reduces power losses on the transmission path, and improves transmission efficiency of the switched converter circuit.

DESCRIPTION OF EMBODIMENTS

To increase a charging power, a conventional charging integrated circuit (Buck conversion circuit) needs to increase a size of an inductor and an area of a charging integrated circuit. However, a size of a mobile terminal is limited, and it is impossible to provide relatively large space for the charging integrated circuit. Therefore, the conventional charging integrated circuit is unworkable, and a 2:1 type switched capacitor converter is an optimal option. However, as a charging current is ever-increasing, for example, if the charging current is increased to 8 A or above, an input current exceeds a maximum input current 5 A of the 2:1 type switched-capacitor converter circuit. Therefore, a voltage conversion ratio of the switched capacitor converter needs to be further increased. However, the switched capacitor converter with a relatively high voltage conversion ratio transmits power serially, resulting in loss increase, a conversion efficiency decrease, and an increase in heat dissipation temperature of the switched capacitor converter, and finally resulting in an increase in heat dissipation temperature of the mobile terminal. This application provides a switched-capacitor converter circuit, and a charging control system and method. A parallel power transmission manner is used. To be specific, a first power supply branch obtained by combining N levels of switched-capacitor converter units and a second power supply branch formed by a first capacitor transmit power in parallel. There are relatively few devices on a power transmission path in the parallel power transmission manner. Therefore, power losses on the transmission path are reduced. In addition, the first capacitor directly charges a load without using any switching transistor, and there are no switching transistor losses on the charging branch, thereby further improving transmission efficiency of the switched converter. In addition, the N levels of switched-capacitor converter units may be sequentially connected in parallel, to further improve the conversion ratio of the switched-capacitor converter circuit.

Figure 2:
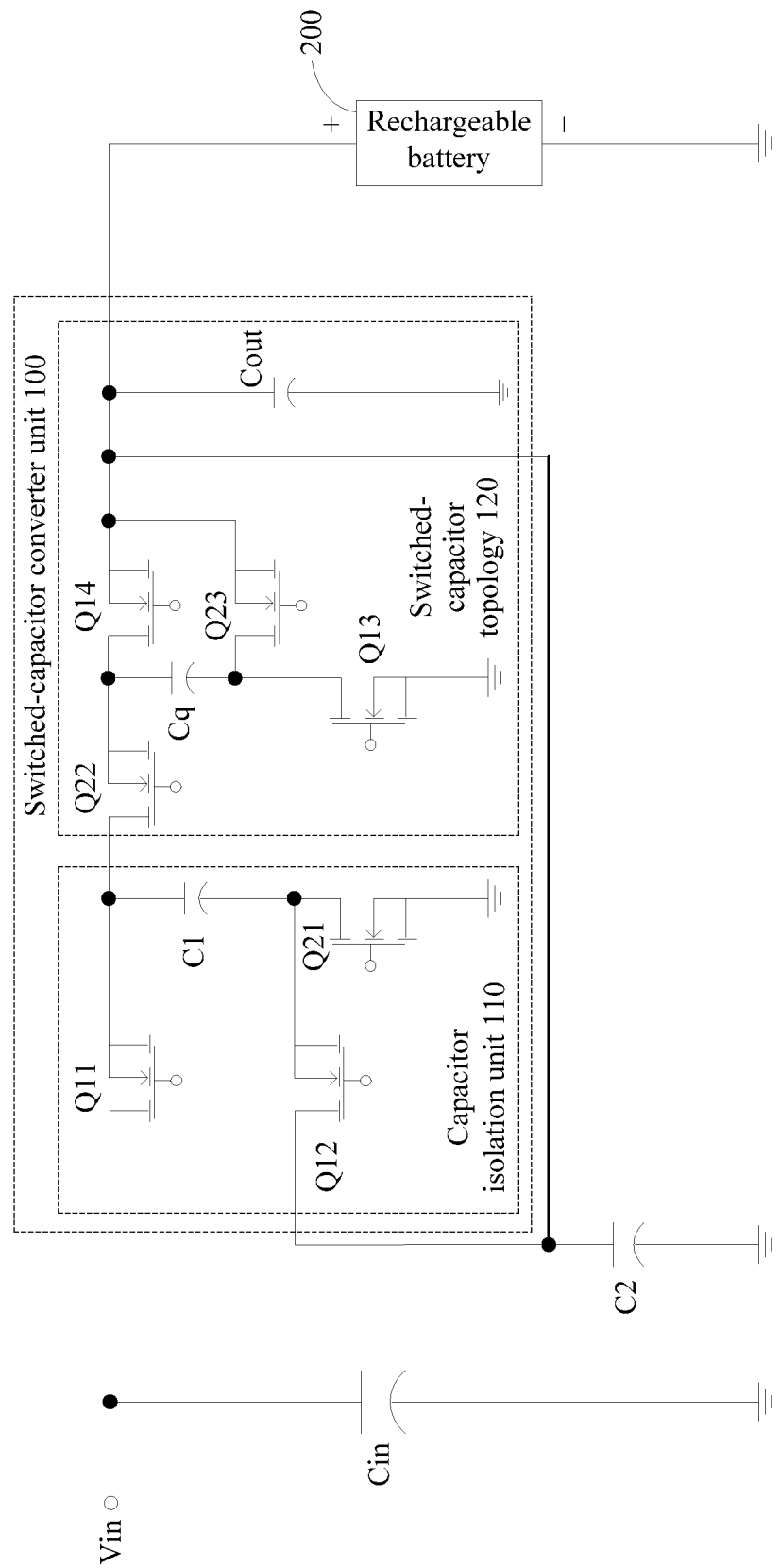
FIG. 2 is a schematic principle diagram of a switched-capacitor converter circuit according to an embodiment of this application.

FIG. 2 is a schematic principle diagram of a switched-capacitor converter circuit according to an embodiment of this application. The switched-capacitor converter circuit may be configured to charge a rechargeable battery in a mobile terminal. As shown in FIG. 2, the switched-capacitor converter circuit includes a capacitor C2 (namely, the first capacitor described above) and N levels of switched-capacitor converter units 100, where N is an integer greater than or equal to 1. In this embodiment, N=1, in other words, the switched-capacitor converter unit 100 includes one level of switched-capacitor topology.

In an embodiment of this application, the switched-capacitor converter unit 100 includes a capacitor isolation unit 110 and a switched-capacitor topology 120.

The capacitor isolation unit 110 is configured to isolate a first voltage Vin from the switched-capacitor topology 120, so that a ratio of a second voltage input by the switched-capacitor topology 120 to the first voltage Vin is ⅔, instead of directly inputting the first voltage Vin.

The switched-capacitor topology 120 is configured to implement voltage conversation of which a ratio of an input voltage to an output voltage is 2:1.

As shown in FIG. 2, the capacitor isolation unit 110 includes a first switching transistor Q11, a second switching transistor Q12, a third switching transistor Q21, and a capacitor C1 (namely, the second capacitor described above).

A first terminal of Q11 is a first terminal of the capacitor isolation unit 110, and has the input voltage Vin (namely, the first voltage). A second terminal of Q11 is connected to a positive electrode of C1. A common terminal of Q11 and C1 is an output terminal of the capacitor isolation unit 110.

A first terminal of Q12 is a second terminal of the capacitor isolation unit 110, and is connected to a positive electrode of C2. A second terminal of Q12 is connected to a negative electrode of C1. In addition, the negative electrode of C1 is connected to a first terminal of Q21, and a second terminal of Q21 is connected to a ground terminal.

In this embodiment, Q11, Q12, and Q21 all are N-type metal oxide field effect transistors (N-metal oxide semiconductor, NMOS) transistors. A drain of the NMOS transistor is a first terminal, a source of the NMOS transistor is a second terminal, and a gate of the NMOS transistor is a control terminal. In other embodiments of this application, an appropriate type of MOS transistor may be selected according to an actual application scenario.

Figure 3:
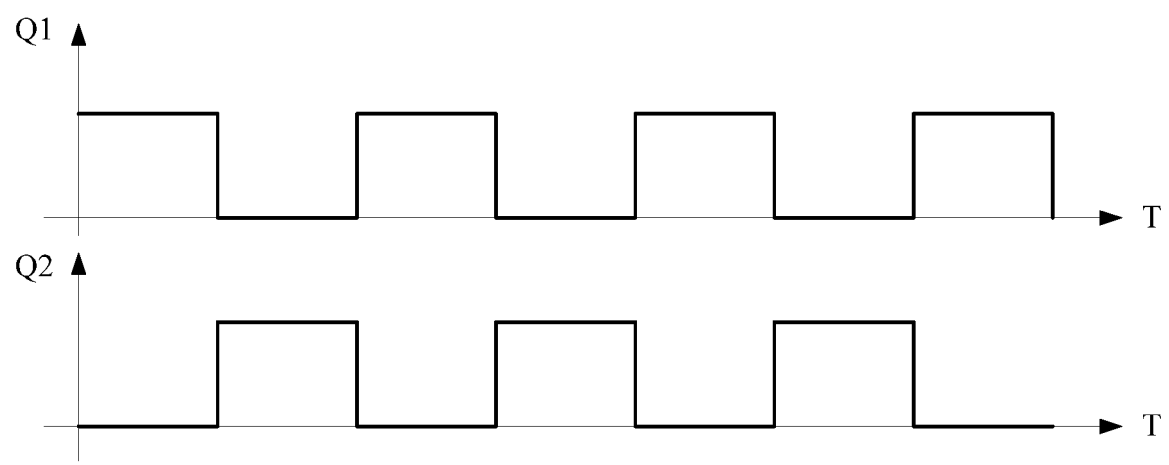
FIG. 3 is a schematic diagram of waveforms of a first control signal and a second control signal according to an embodiment of this application.

At control terminals of Q11 and Q12, first control signals Q1 are input, and at a control terminal of Q21, a second control signal Q2 is input. FIG. 3 is a schematic diagram of waveforms of Q1 and Q2. Both Q1 and Q2 have a duty cycle of 50% (excluding a dead time). If the dead time is included, for example, a dead time duty cycle is 2%, the duty cycles of both Q1 and Q2 are 49%. In addition, waveforms of Q1 and Q2 complement each other.

As shown in FIG. 2, the switched-capacitor topology 120 includes a fourth switching transistor Q22, a fifth switching transistor Q14, a sixth switching transistor Q13, a seventh switching transistor Q23, a capacitor Cq (namely, a third capacitor), and a capacitor Cout (namely, a fourth capacitor).

A first terminal of Q22 is an input terminal of the switched-capacitor topology 120, and a second terminal of Q22 is connected to a positive electrode of Cq. In addition, the second terminal of Q22 is connected to a first terminal of Q14, and a second terminal of Q14 is an output terminal of the switched-capacitor topology 120.

A negative electrode of Cq is connected to a first terminal of Q13, and a second terminal of Q13 is connected to the ground terminal. A first terminal of Q23 is connected to a common terminal of Cq and Q13, and a second terminal of Q23 is connected to a second terminal of Q14.

At control terminals of Q22 and Q23, the second control signals Q2 are input, and at control terminals of Q13 and Q14, the first control signals Q1 are input.

In this embodiment, Q22, Q23, Q13, and Q14 are all N-type MOS transistors. A drain of the N-type MOS transistor is the first terminal, a source of the N-type MOS transistor is the second terminal, and a gate of the N-type MOS transistor is the control terminal.

In other embodiments of this application, other types of switching transistors may be selected according to actual application scenarios. This is not limited in this application.

In an application scenario of this application, as shown in FIG. 2, the first terminal of the capacitor isolation unit 110 is connected to a capacitor Cin, and the capacitor Cout is a part of the switched-capacitor topology, to implement a 2:1 switching conversion. In addition, Cout further performs filtering on a charging voltage Vout of the rechargeable battery.

Figure 4:
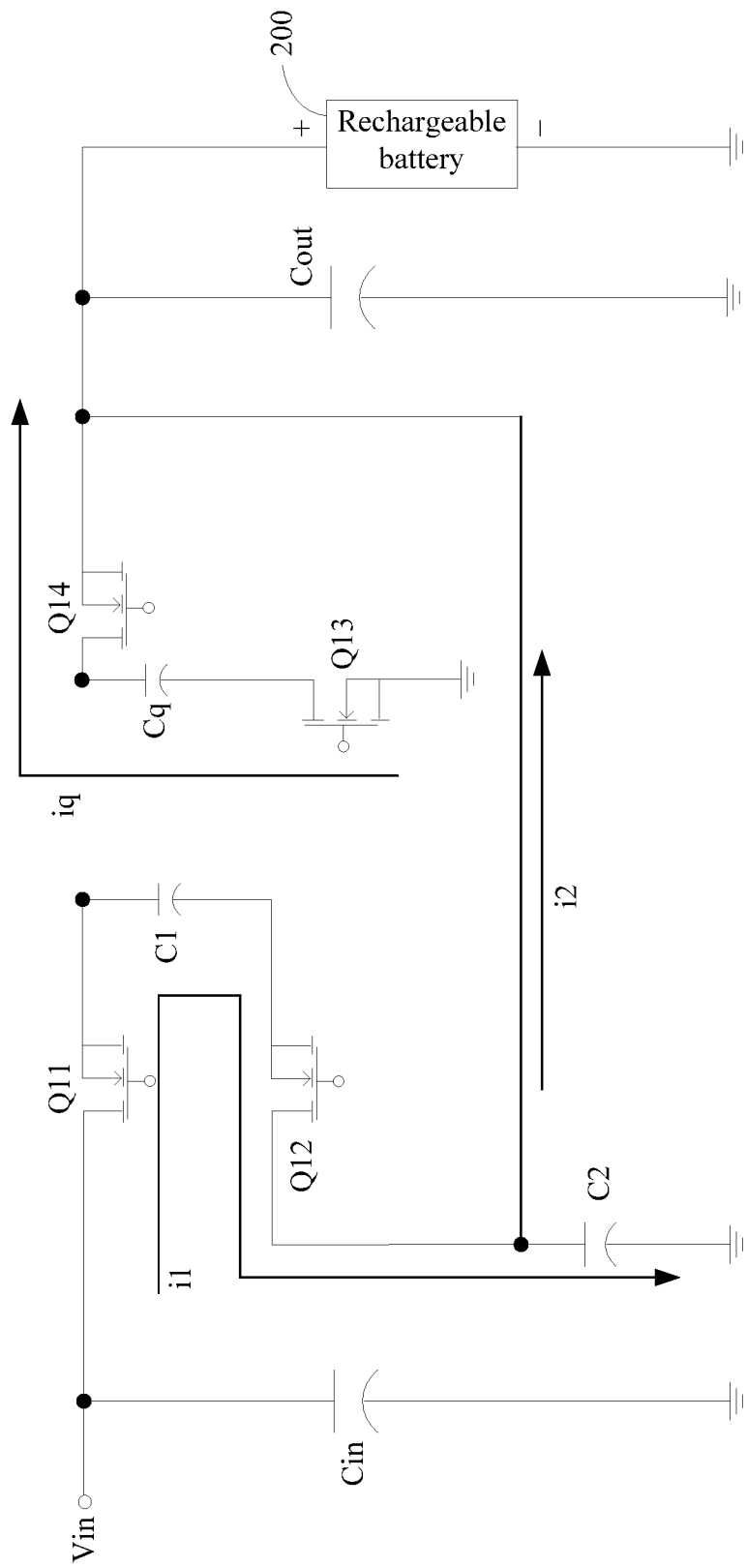
FIG. 4 is a diagram of an equivalent circuit of a switched-capacitor converter circuit in a first state according to an embodiment of this application.
Figure 5:
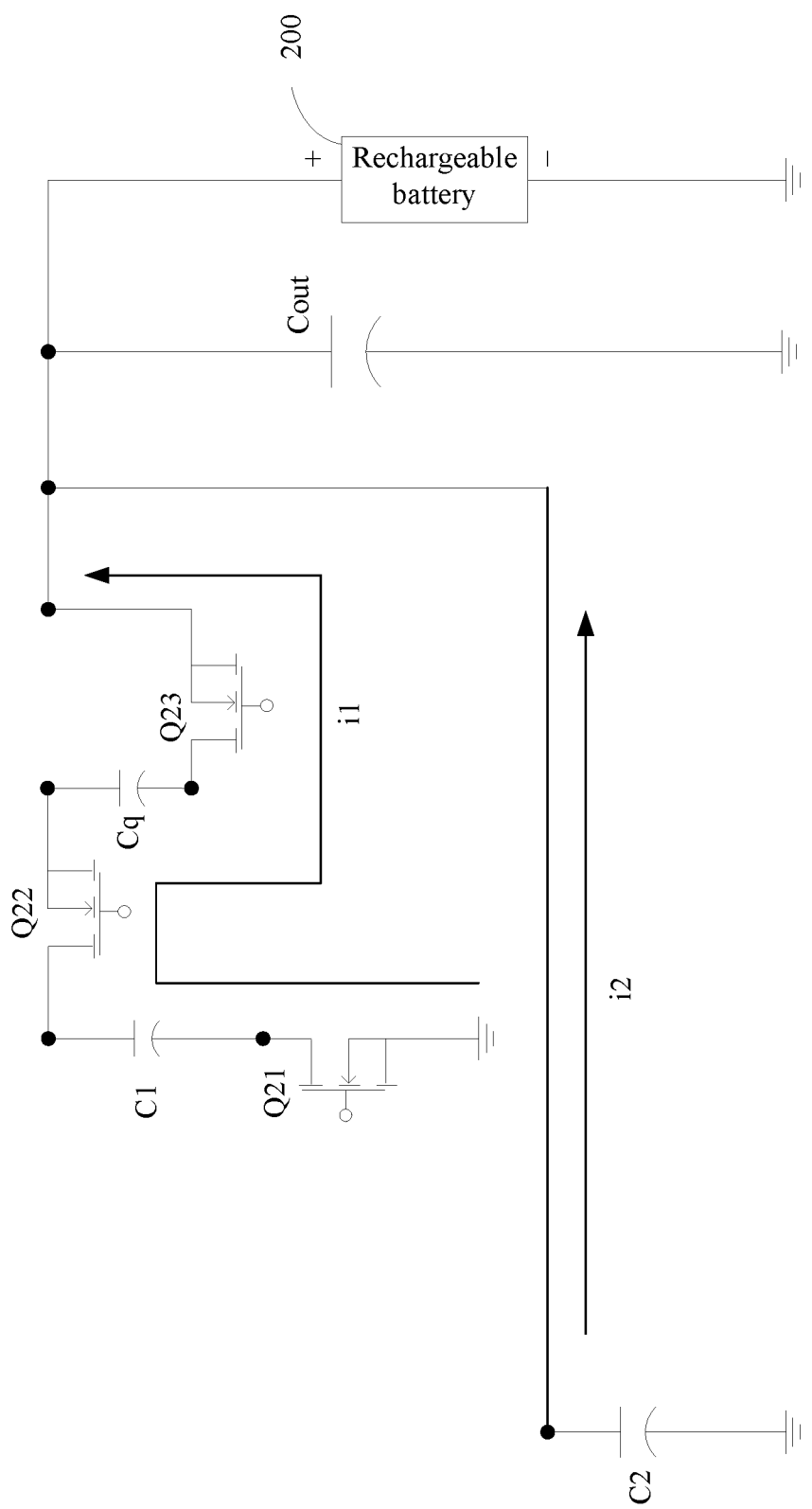
FIG. 5 is a diagram of an equivalent circuit of a switched-capacitor converter circuit in a second state according to an embodiment of this application.

The following describes in detail a working process of the switched-capacitor converter circuit with reference to FIG. 4 and FIG. 5.

Figure 1:
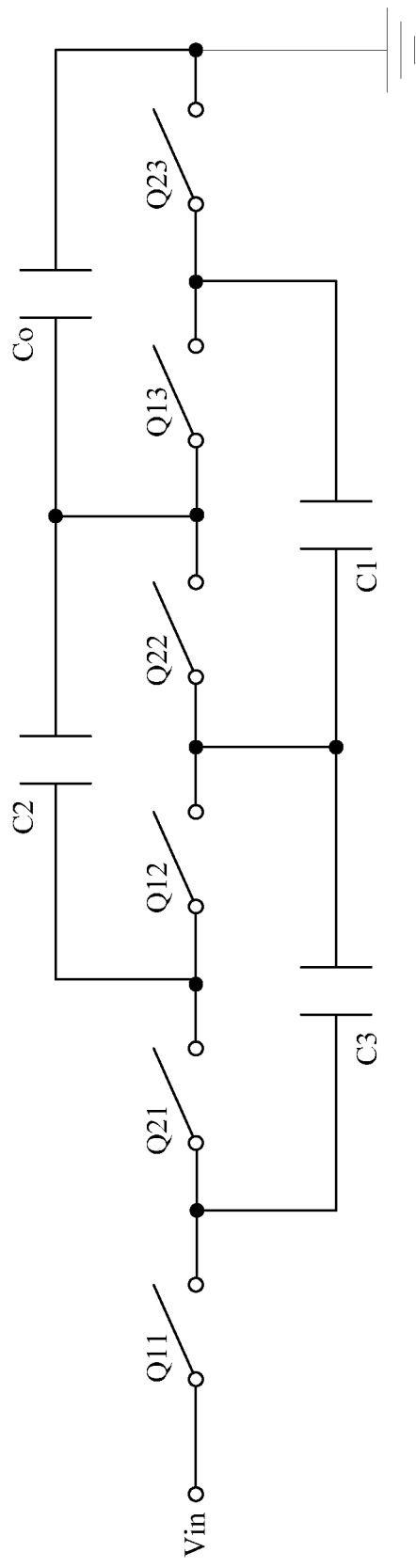
FIG. 1 is a schematic principle diagram of a conventional 3:1 type switched capacitor converter circuit.

FIG. 4 is a diagram of an equivalent circuit of the switched-capacitor converter circuit shown in FIG. 1 in a first state. The first state means that a switching transistor controlled by Q1 is on, and the switching transistor controlled by Q2 is off. To be specific, Q11, Q12, Q13, and Q14 are on, and Q21, Q22, and Q23 are off.

In this state, C1 and C2 are connected in series, and the input voltage Vin charges C1 and C2. In addition, C2 directly charges a rechargeable battery 200 (namely, the load described above). In a stable state, a voltage of C2 is Vout. In addition, Cq charges the rechargeable battery 200 through Q13 and Q14. In the stable state, a voltage of Cq is Vout.

FIG. 5 is a diagram of an equivalent circuit of the switched-capacitor converter circuit shown in FIG. 2 in a second state. The second state means that a switching transistor controlled by Q1 is off, and the switching transistor controlled by Q2 is on. To be specific, Q11, Q12, Q13, and Q14 are off, and Q21, Q22, and Q23 are on.

In this state, a negative electrode of C1 is grounded through Q21, C1 charges a capacitor Cq through Q22, and C1 charges the rechargeable battery through Q23. C2 directly charges the rechargeable battery 200.

In a stable state, a voltage of Cq is Vout, and a battery voltage is Vout. Therefore, according to the KVL law, it can be learned that a voltage of C1 is $V_{C1}=V_{Cq}+Vout$, that is, $V_{C1}=2Vout$. In other words, in the stable state, a voltage $V_{C2}$ of C2 is Vout.

In the first state, C1 and C2 are connected in series, and a voltage sum of C1 and C2 is the input voltage Vin, that is, Vin=$V_{C1}$+$V_{C2}$=3Vout. It can be learned that the switched-capacitor converter circuit implements that an input-output voltage ratio is 3:1, that is, a conversion ratio of the switched-capacitor converter circuit is 3:1.

In the first state, C1 and C2 are connected in series, and therefore C1 and C2 have a same charging current $i_{in}$. A charging power of C1 is $P_1$=$i_{in}$*$V_{C1}$, and a charging power of C2 is $P_2$=$i_{in}$*$V_{C2}$. However, in the stable state, $V_{C1}$=2$V_{C2}$, and therefore $P_1$=2$P_2$. According to the capacitor balanced charging theory, it can be learned that an output power of C1 is equal to an input power of C1, and an output power of C2 is equal to an input power of C2. Therefore, $P_{C1}$=2$P_{C2}$, where $P_{C1}$ is the output power of C1, and $P_{C2}$ is the output power of C2.

In addition, $P_{C1}$=i1*Vout, $P_{C2}$=i2*Vout, and both an output voltage of a branch including C2 and an output voltage of a branch including switched-capacitor topology are Vout. Therefore, i1=2i2, where i1 represents an output current of the branch including switched-capacitor topology, and i2 is an output current of the branch including C2. Therefore, an input current of the rechargeable battery is ib=i1+i2=3i2, that is, i2=ib/3.

The output power of C2 is $P_{C2}$=i2*$V_{C2}$=(ib/3)*Vout=(ib*Vout)/3, where ib*Vout represents an input power of the rechargeable battery, in other words, C2 provides ⅓ of the power for the rechargeable battery. C2 directly charges the rechargeable battery without using any switching transistor, and therefore charging efficiency of C2 theoretically reaches 100%. This improves conversion efficiency of the entire switched-capacitor converter circuit.

According to the switched-capacitor converter circuit provided in an embodiment, the first capacitor and the two power supply branches of the switched-capacitor converter unit transmit power in parallel. In comparison with a serial power transmission manner, there are relatively few devices on a power transmission path in the parallel power transmission manner. This reduces power losses on the transmission path, and improves transmission efficiency of the switched converter circuit. In addition, the first capacitor directly charges the rechargeable battery without using any switching transistor, and there are no switching transistor losses on the charging branch, thereby further improving transmission efficiency of the switched-capacitor converter circuit.

Figure 6:
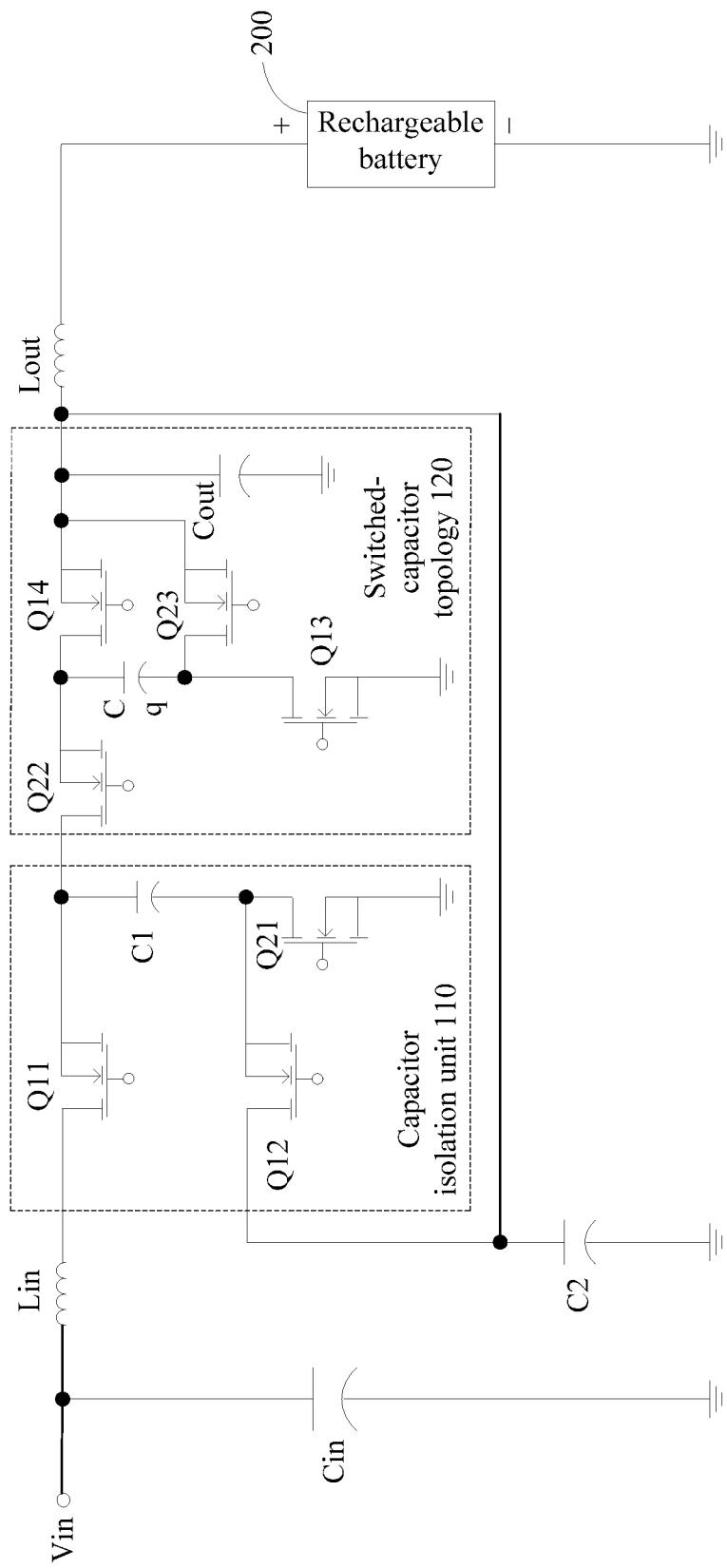
FIG. 6 is a schematic principle diagram of another switched-capacitor converter circuit according to an embodiment of this application.

FIG. 6 is a schematic principle diagram of another switched-capacitor converter circuit according to an embodiment of this application. On a basis of the embodiment shown in FIG. 2, an output inductor Lout is added in this embodiment.

One terminal of Lout is connected to an output terminal of the switched-capacitor topology (namely, the second terminal of Q14), and the other terminal of Lout is connected to a positive electrode of a rechargeable battery. Lout is resonant with Cq or soft switching is implemented, thereby reducing switching losses in the switched-capacitor topology.

A value range of Lout is [1(20*pi^2*Fs^2*Cq), 4/(pi^2*Fs^2Cq)], where Fs represents a switching frequency of Q1, pi represents 3.1415926, and Cq represents a capacitor value of the capacitor Cq.

In another embodiment of this application, as shown in FIG. 6, an input inductor Lin may be added at an input terminal of a capacitor isolation unit. Lin is resonant with C1 and C2, and Q11 and Q12 may support soft switching, to reduce switching losses of the capacitor isolation unit.

The soft switching technology is based on a resonance principle, so that a current (or a voltage) in a switching device varies according to the sine or quasi-sine law. When the current reaches zero naturally, the switching device becomes off (or when the voltage reaches zero, the switching device becomes on), to reduce switching losses of the switching device.

A value range of Lin is [1(20*pi^2*Fs^2*Ceq), 4/(pi^2*Fs^2*Ceq)], where Fs represents a switching frequency of Q1, pi represents 3.1415926, and Ceq represents an equivalent capacitor value of serially connected C1 and C2.

In an embodiment of this application, Lin and Lout each may be external inductors or parasitic inductors between a printed circuit board (PCB) and a device. This is not limited in this application.

Figure 7:
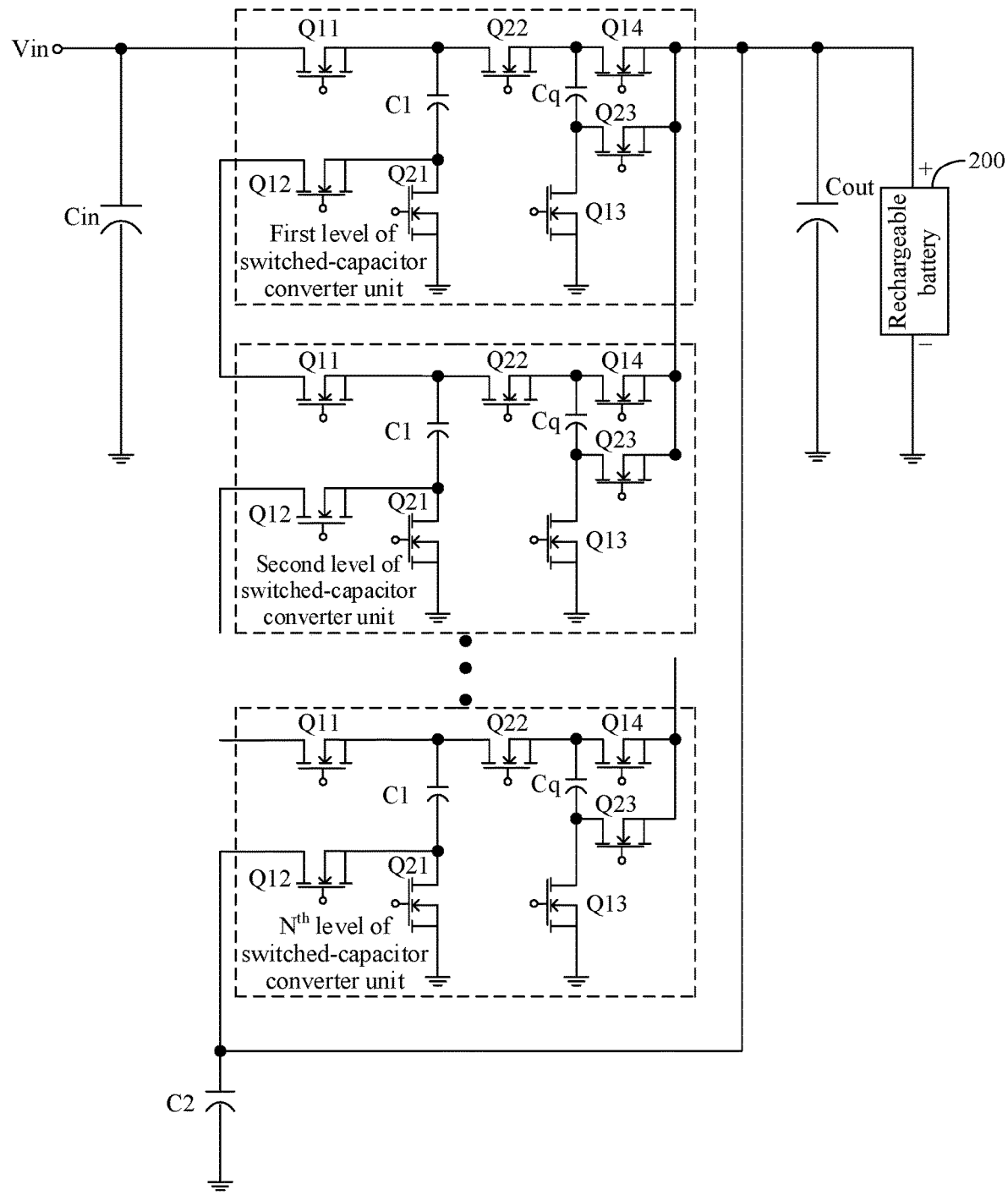
FIG. 7 is a schematic principle diagram of still another switched-capacitor converter circuit according to an embodiment of this application.

FIG. 7 is a schematic principle diagram of still another switched-capacitor converter circuit according to an embodiment of this application. The switched-capacitor converter circuit in this embodiment includes N levels of switched-capacitor converter units, where N is a positive integer greater than 1.

As shown in FIG. 7, input terminals of the N levels of switched-capacitor converter units are sequentially connected in series, and output terminals are connected in parallel to a positive electrode of a rechargeable battery.

A first input terminal of a first level of switched-capacitor converter unit receives an input voltage Vin, and a second input terminal of the first level of switched-capacitor converter unit is connected to a first input terminal of a second level of switched-capacitor converter unit. A second input terminal of the second level of switched-capacitor converter unit is connected to a first input terminal of a third level of switched-capacitor converter unit, and an output terminal of the second level of switched-capacitor converter unit is connected to an output terminal of the first level of switched-capacitor converter unit. By analogy, a first input terminal of an $N^{th}$ level of switched-capacitor converter unit is connected to a second input terminal of an $(N-1)^{th}$ level of switched-capacitor converter unit, a second input terminal of the $N^{th}$ level of switched-capacitor converter unit is connected to a positive electrode of a capacitor C2, and an output terminal of the $N^{th}$ level of switched-capacitor converter unit is connected to a positive electrode of a rechargeable battery.

Output terminals of the N levels of switched-capacitor converter units are connected in parallel, that is, output terminals of the N switched-capacitor converter units have a same electric potential, and the electric potential is equal to an electric potential of a positive electrode of Cout. Therefore, Couts of the N levels of switched-capacitor converter units may be equivalent one Cout, that is, the schematic principle diagram of a circuit shown in FIG. 7 is obtained.

Each level of switched-capacitor converter unit includes a capacitor isolation unit and a switched-capacitor topology. N C1s are sequentially connected to one C2 in series. In a first state, the input voltage Vin charges the sequentially connected N C1s and the one C2. In other words, Vin=N$V_{C1}$+$V_{C2}$. As described above, $V_{C2}$=Vout and $V_{C1}$=2Vout, and therefore Vin=(2N+1)Vout. In other words, Vin:Vout=(2N+1):1.

According to the switched-capacitor converter circuit provided in this embodiment, the N levels of switched-capacitor converter units transmit power in parallel. This further improves a voltage conversion ratio of the switched-capacitor converter circuit, and further improves transmission efficiency.

Corresponding to the switched-capacitor converter circuit, this application further provides an embodiment of a charging control system to which the switched-capacitor converter circuit is applied.

Figure 8:
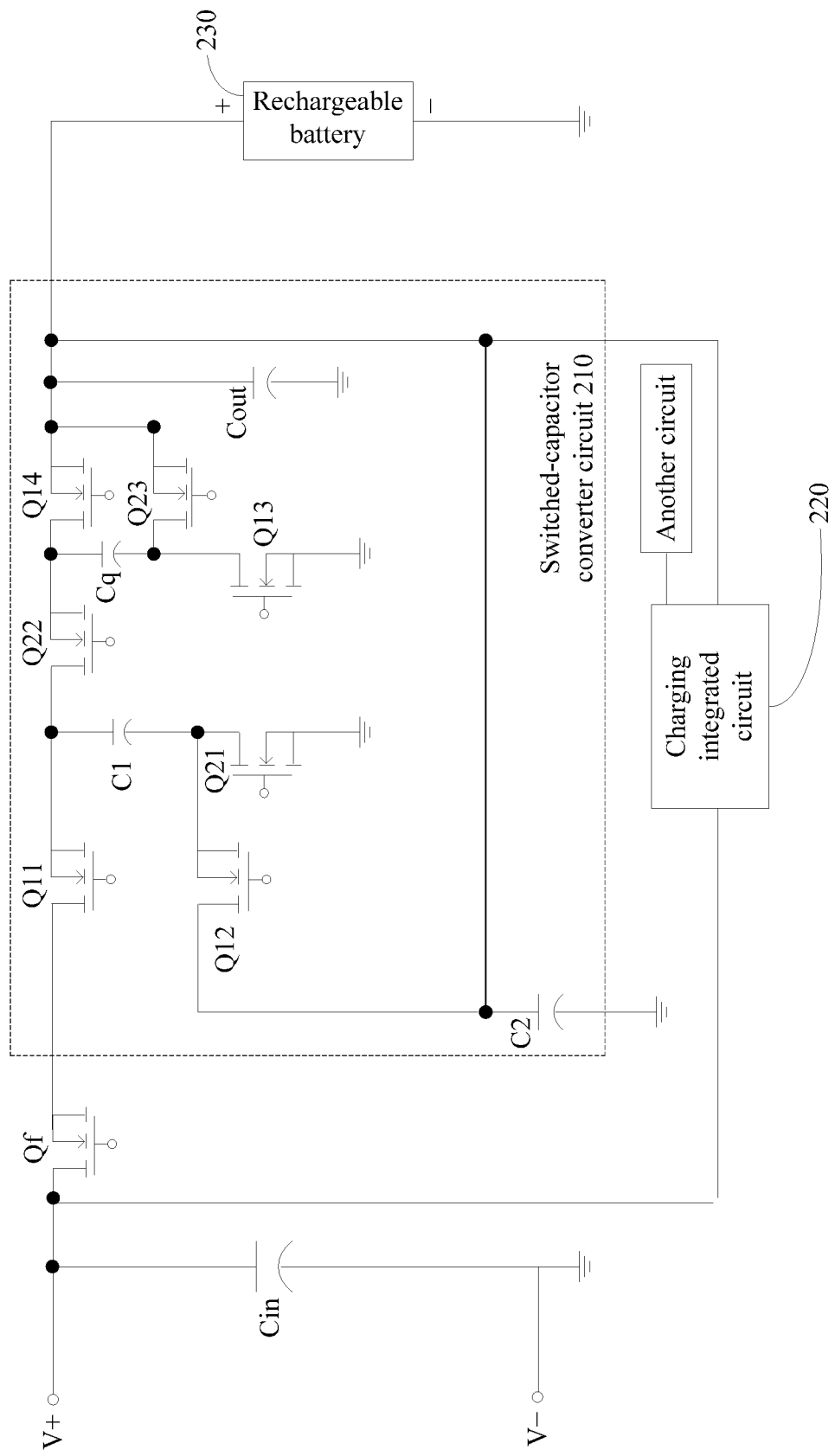
FIG. 8 is a schematic principle diagram of a charging control system according to an embodiment of this application.

FIG. 8 is a schematic principle diagram of a charging control system according to an embodiment of this application. The charging control system includes the switched-capacitor converter circuit 210 shown in FIG. 2, FIG. 6, or FIG. 7, a charging integrated circuit 220, a rechargeable battery 230, and an eighth switching transistor Qf. The charging integrated circuit 220 is a conventional charging control circuit including a buck circuit.

An input terminal of the switched-capacitor converter circuit 210 is connected to a V+ terminal through Qf, and a V− terminal is grounded. A voltage between V+ and V− is Vin. An output terminal of the switched-capacitor converter circuit 210 is connected to a positive electrode of the rechargeable battery 230.

A first terminal of Qf is connected to a capacitor Cin, and a second terminal of Qf is connected to the input terminal of the switched-capacitor converter circuit 210. Qf is configured to prevent battery current backflow.

In this embodiment, Qf is an NMOS transistor, a drain of the NMOS transistor is a first terminal of Q11, a source of the NMOS transistor is a second terminal of Q11, and a gate of the NMOS transistor is a control terminal of Q11. In other embodiments of this application, an appropriate type of Qf may be selected according to a corresponding application scenario.

An input terminal of the charging integrated circuit 220 is connected to the V+ terminal, a first output terminal of the charging integrated circuit 220 is connected to a first power supply terminal of a mobile terminal, and a second output terminal of the charging integrated circuit 220 is connected to the positive electrode of the rechargeable battery 230.

The following describes in detail a working process of the charging control system provided in this embodiment.

Before the working process of the charging control system is described, a charging process of the rechargeable battery is first described. The charging process of the rechargeable battery includes three stages: a constant current charging mode, a constant voltage charging mode, and a trickle charging mode. In the constant current charging mode, charging is performed at a constant current, a charging voltage rises quickly, and when the charging voltage reaches a preset value, the charging goes to the constant voltage charging mode. In the constant voltage charging mode, charging is performed at a constant voltage, a charging current gradually decreases, and when the charging current decreases to 0, the rechargeable battery is fully charged. After the rechargeable battery is fully charged, due to self-discharge of the battery, some current losses are caused. In this case, charging is performed in the trickle charging mode in which a charging current is quite small, to only ensure that the rechargeable battery is in a charged state.

In an embodiment of this application, when the rechargeable battery 230 needs to work in the constant current charging mode, the charging integrated circuit 220 supplies power to another circuit in the mobile terminal, and the switched-capacitor converter circuit 210 charges the rechargeable battery 230, and adjusts a charging voltage by using a previous level adapter. In addition, the charging integrated circuit 220 supplies power to the another circuit in the mobile terminal. When it is detected that the rechargeable battery 230 needs to work in the trickle charging mode or the constant voltage charging mode, the charging integrated circuit 220 charges the rechargeable battery and also supplies power to the another circuit in the mobile terminal, and the switched-capacitor converter circuit stops working.

In another embodiment of this application, when it is detected that a charging current of the rechargeable battery 230 is greater than or equal to a preset current value (for example, 1 A), the switched-capacitor converter circuit 210 charges the rechargeable battery 230, and the charging integrated circuit 220 supplies power to the another circuit in the mobile terminal. When a charging current of the rechargeable battery 230 is less than a preset current value, the charging integrated circuit 220 supplies power to both the rechargeable battery 230 and the another circuit in the mobile terminal.

In an embodiment of this application, the charging integrated circuit 220 may detect a charging mode of the rechargeable battery, and control the charging integrated circuit 220 and the switched-capacitor converter circuit 210 to switch working. In this application scenario, the charging integrated circuit 220 provides an enablement signal to the switched-capacitor converter circuit 210, and the enablement signal is used to control whether the switched-capacitor converter circuit 210 works. For example, when the enablement signal is "ON", a control signal generation circuit generates a signal Q1 and a signal Q2, or when the enablement signal is "OFF", the control signal generation circuit does not output a signal Q1 or a signal Q2.

In another embodiment of this application, another controller (for example, a charging management controller) in the mobile terminal may detect a charging mode of the rechargeable battery, and control the charging integrated circuit 220 and the switched-capacitor converter circuit 210 to switch working. A control process is the same as that in a control scenario of the charging integrated circuit. Details are not described herein again.

The charging control system provided in this embodiment includes the switched-capacitor converter circuit provided in the foregoing embodiment and the conventional charging integrated circuit. When the rechargeable battery is in the constant current charging mode, or when the charging current is greater than or equal to a current threshold, the switched-capacitor converter circuit charges the rechargeable battery while the charging integrated circuit supplies power to the another circuit in the mobile terminal. When the rechargeable battery is in the constant voltage charging mode, or when the charging current is less than a current threshold, the charging integrated circuit works and the switched-capacitor converter circuit does not work, and the charging integrated circuit supplies power to the rechargeable battery and the another circuit in the mobile terminal. In the charging control system, the conventional charging integrated circuit is used to collaboratively work with the switched-capacitor converter circuit, so that a change of the charging control system is relatively small. In such a charging control system, when a large current is required to charge the rechargeable battery, the switched-capacitor converter circuit with a large charging power and small power consumption is used to charge the rechargeable battery, thereby increasing a charging speed without increasing power consumption.

Figure 9:
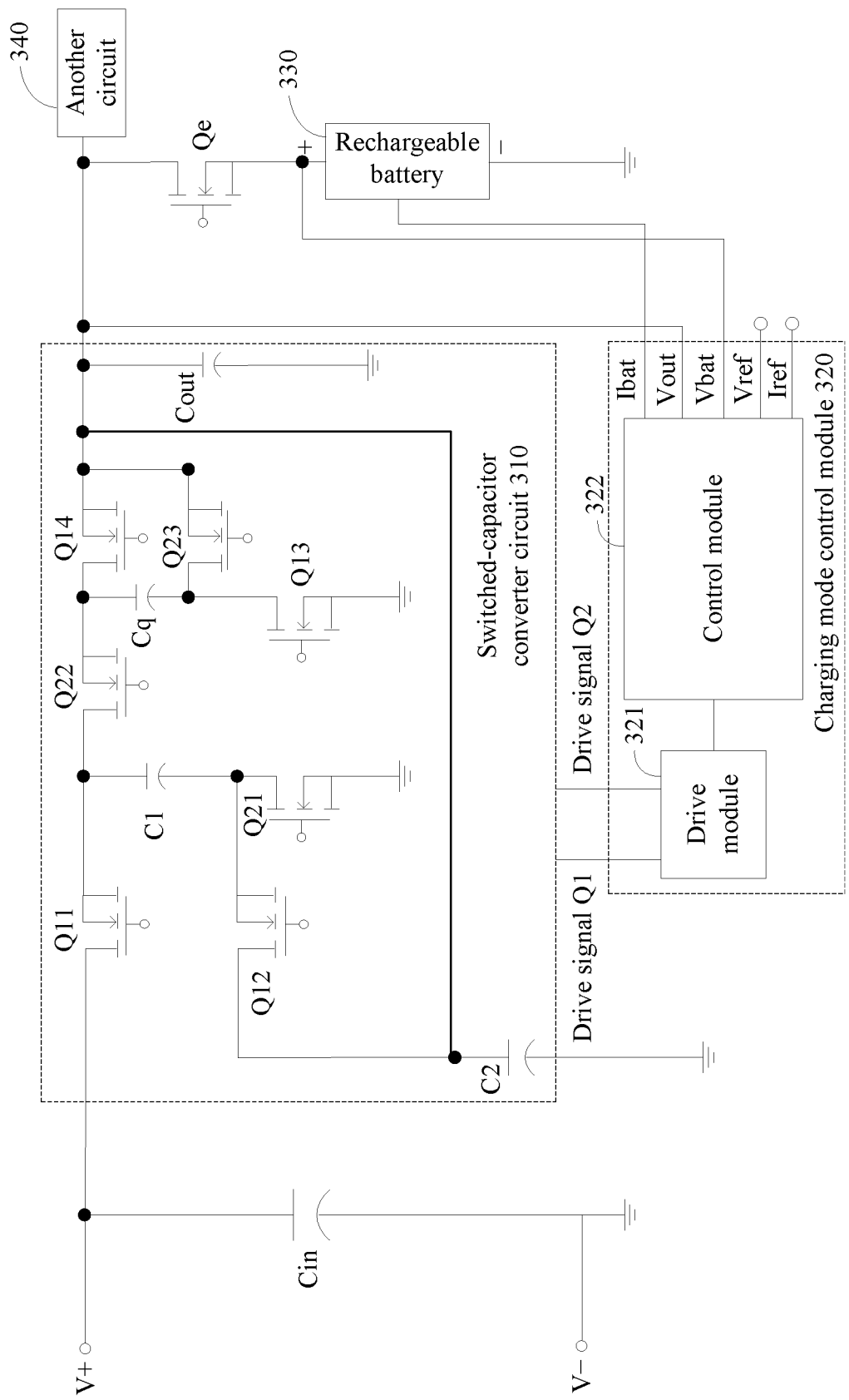
FIG. 9 is a schematic principle diagram of another charging control system according to an embodiment of this application.

FIG. 9 is a schematic principle diagram of another charging control system according to an embodiment of this application, applied to a mobile terminal. The charging control system includes the switched-capacitor converter circuit 310 shown in FIG. 2, FIG. 6, or FIG. 7, a charging mode control module 320, a rechargeable battery 330, and a ninth switching transistor Qe.

An input terminal of the switched-capacitor converter circuit 310 receives Vin, an output terminal of the switched-capacitor converter circuit 310 is connected to the rechargeable battery 330 and another circuit 340. The another circuit 340 is a circuit, in the mobile terminal, that needs power supply, except for the rechargeable battery 330. In addition, the input terminal of the switched-capacitor converter circuit 310 is connected to an input capacitor Cin, and the output terminal of the switched-capacitor converter circuit 310 is connected to an output capacitor Cout. Both Cin and Cout play a filtering function.

A first detection terminal of the charging mode control module 320 is configured to detect an output voltage Vout of the switched-capacitor converter circuit 310, a second detection terminal is configured to detect a charging current Ibat of the rechargeable battery 330, a third detection terminal is configured to detect a voltage Vbat of the rechargeable battery 330. A first reference terminal of the charging mode control module 320 receives a reference voltage Vref, and a second reference terminal receives a reference current Iref. A first output terminal of the charging mode control module 320 is connected to a control terminal of a type-1 switching transistor of the switched-capacitor converter circuit 310, and a second output terminal is connected to a control terminal of a type-2 switching transistor of the switched-capacitor converter circuit 310.

The type-1 switching transistor includes Q11, Q12, Q13, and Q14, and the type-2 switching transistor includes Q21, Q22, and Q23. Both the reference current Iref and the reference voltage Vref may be set according to an actual requirement. In addition, Vref has different values in different modes. For example, in a constant voltage charging mode and in a trickle charging mode, reference may be made to Vref. In the constant voltage charging mode, Vref is a reference voltage value required by the constant voltage charging mode; and in the trickle charging mode, Vref is a reference voltage value required by the trickle charging mode.

A first terminal of Qe is connected to the output terminal of the switched-capacitor converter circuit 310, a second terminal of Qe is connected to a positive electrode of the rechargeable battery 330. Qe plays a role of disabling a signal when the rechargeable battery is fully charged, to avoid repeated charge and discharge of the rechargeable battery 330.

The charging mode control module 320 collects the charging current that, a charging voltage Vout, and a battery voltage Vbat that are of the rechargeable battery 330, and controls a charging mode of the rechargeable battery based on the collected Ibat, Vout, and Vbat.

When the rechargeable battery is in a constant current charging mode, Ibat is detected in real time. When Ibat<Iref (a current threshold), the switched-capacitor converter circuit 310 is controlled to work. The switched-capacitor converter circuit 310 works at a first preset switching frequency and a first preset duty cycle, to charge the rechargeable battery 330 at a constant current. In addition, the switched-capacitor converter circuit 310 supplies power to the another circuit. When Ibat≥Iref, the switched-capacitor converter circuit 310 shuts off, and the output capacitor charges the rechargeable battery 330 and supplies power to the another circuit 340.

When the rechargeable battery is in the constant voltage charging mode, Vout is monitored in real time. When Vout<Vref (a voltage threshold), the switched-capacitor converter circuit 310 is controlled to work. The switched-capacitor converter circuit 310 works at a second preset switching frequency and a second preset duty cycle, to charge the rechargeable battery 330 at a constant voltage. In addition, the switched-capacitor converter circuit 310 supplies power to the another circuit. When Vout≥Vref, the switched-capacitor converter circuit 310 shuts off, and the output capacitor charges the rechargeable battery 330 and supplies power to the another circuit 340.

When the rechargeable battery is in the trickle charging mode, Vbat is monitored in real time. When Vbat<Vref (a voltage threshold), the switched-capacitor converter circuit 310 is controlled to work. The switched-capacitor converter circuit 310 works at a third preset switching frequency and a third preset duty cycle, to charge the rechargeable battery 330 at a trickle current and finally fully charge the rechargeable battery 330. When Vbat≥Vref, the switched-capacitor converter circuit 310 shuts off, and the output capacitor charges the rechargeable battery 330 and supplies power to the another circuit 340.

A person skilled in the art can understand that, when the switched-capacitor converter circuit 310 works, a switching frequency and a duty cycle of the switched-capacitor converter circuit 310 are adjusted to make the switched-capacitor converter circuit output different voltages to the rechargeable battery, so as to implement different charging modes of the rechargeable battery 330.

In an embodiment of this application, the charging mode control module 320 includes a control module 321 and a drive module 322. The drive module 322 controls the switched-capacitor converter circuit 310 to work or not (normally work or stop working). When the control module 321 determines to control the switched-capacitor converter circuit 310 to normally work, the drive module 322 is controlled to output an enablement drive signal "ON", that is, normally output a first control signal Q1 and a second control signal Q2, so that the switched-capacitor converter circuit 310 normally works. When the control module 321 determines to control the switched-capacitor converter circuit 310 to shut off, the drive module 322 is controlled to output an enablement drive signal "OFF", that is, not to output Q1 and Q2, so that the switched-capacitor converter circuit stops working.

In the charging control system provided in this embodiment, the charging mode control module is used to implement closed control over the rechargeable battery. During the entire control process, the switched-capacitor converter circuit is used to charge the rechargeable battery. Therefore, a charging integrated circuit is not required, thereby reducing system complexity and also reducing system costs.

Figure 10:
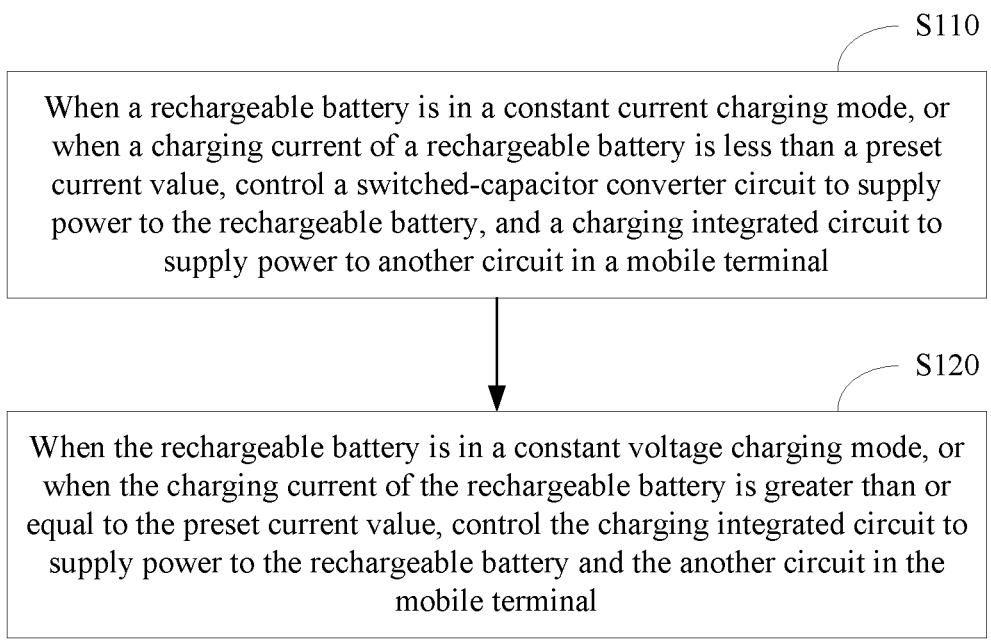
FIG. 10 is a flowchart of a charging control method according to an embodiment of this application.

Corresponding to the charging control system embodiment shown in FIG. 8, this application further provides a corresponding charging control method embodiment. As shown in FIG. 10, the charging control method may include the following operations.

Operation S110. When a rechargeable battery is in a constant current charging mode, or when a charging current of a rechargeable battery is less than a preset current value (for example, 1 A), control a switched-capacitor converter circuit to supply power to the rechargeable battery, and the charging integrated circuit to supply power to another circuit in a mobile terminal.

Operation S120. When the rechargeable battery is in a constant voltage charging mode, or when the charging current of the rechargeable battery is greater than or equal to the preset current value, control the charging integrated circuit to supply power to both the rechargeable battery and the another circuit in the mobile terminal.

According to the charging control method provided in this embodiment, when a small current is required, the charging integrated circuit works but the switched-capacitor converter circuit does not work; or when a large current is required, the switched-capacitor converter circuit charges the rechargeable battery, and the charging integrated circuit supplies power to the another circuit in the mobile terminal. The conventional charging integrated circuit is used to collaboratively work with the switched-capacitor converter circuit, so that a change of the charging control system is relatively small. In such a charging control system, when a large current is required to charge the rechargeable battery, the switched-capacitor converter circuit with a large charging power and small power consumption is used to charge the rechargeable battery, thereby increasing a charging speed without increasing power consumption.

Corresponding to the charging control system embodiment, this application further provides a corresponding charging control method embodiment. The charging control method is applied to the charging mode control module in the charging control system shown in FIG. 9.

The charging control method may include: when detecting, in a constant current charging mode, that a charging current of a rechargeable battery is less than a current threshold (Iref), or when detecting, in a constant voltage charging mode, that an output voltage of the switched-capacitor converter circuit is less than a voltage threshold (Vref), or when detecting, in a trickle charging mode, that a voltage of the rechargeable battery is less than a voltage threshold (Vref), outputting a first control signal through a first output terminal of the charging mode control module, and outputting a second control signal through a second output terminal of the charging mode control module, to make the switched-capacitor converter circuit work; or when detecting, in a constant current charging mode, that a charging current of the rechargeable battery is greater than or equal to the current threshold (Iref), or when detecting, in a constant voltage charging mode, that an output voltage of the switched-capacitor converter circuit is greater than or equal to the voltage threshold (Vref), or when detecting, in a trickle charging mode, that a voltage of the rechargeable battery is greater than or equal to the voltage threshold (Vref), disabling the first control signal and the second control signal.

According to the charging control method provided in this embodiment, the charging mode control module is used to implement closed control over the rechargeable battery. During the entire control process, the switched-capacitor converter circuit is used to charge the rechargeable battery. Therefore, a charging integrated circuit is not required, thereby reducing system complexity and also reducing system costs.

It should be noted that the embodiments in this specification are all described in a progressive manner, each embodiment focuses on a difference from other embodiments, and for same or similar parts in the embodiments, reference may be made to these embodiments. An apparatus embodiment is basically similar to a method embodiment, and therefore is described briefly. For related parts, reference may be made to partial descriptions in the method embodiment.

Finally, it should be noted that in this specification, relational terms such as first and second are only used to distinguish one entity or operation from another, and do not necessarily require or imply that any actual relationship or sequence exists between these entities or operations. Moreover, the terms "include", "comprise", or their any other variants are intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

The embodiments disclosed above are described to enable a technical person skilled in the art to implement or use the present application. Various modifications to the embodiments are obvious to the technical person skilled in the art, and general principles defined in this specification may be implemented in other embodiments without departing from the spirit or scope of the present application. Therefore, the present application will not be limited to the embodiments described in this specification but extends to the widest scope that complies with the principles and novelty disclosed in this specification.

The foregoing descriptions are merely example implementations of the present application. It should be noted that a person of ordinary skill in the art may make several improvements or polishing without departing from the principle of the present application and the improvements or polishing shall fall within the protection scope of the present application.

What is claimed is:

1. A switched-capacitor converter circuit, comprising a first capacitor and N levels of switched-capacitor converter units, wherein N is an integer greater than or equal to 1; wherein input terminals of the N levels of switched-capacitor converter units are connected in series, and output terminals of the N levels of switched-capacitor converter units are connected in parallel, to form a first power supply branch to supply power to a load, a second input terminal of each level of each switched-capacitor converter unit is connected to a first input terminal of a next level of the switched-capacitor converter unit, and an output terminal of each level of the switched-capacitor converter unit is connected to the load; wherein a first input terminal of a first level of each switched-capacitor converter unit is configured to input a first voltage signal, wherein the first voltage signal is an input voltage Vin of the switched-capacitor converter circuit, and a second input terminal of an $N^{th}$ level of the switched-capacitor converter unit is configured to connect to a positive electrode of the first capacitor, and a negative electrode of the first capacitor connected to a ground terminal;

wherein the positive electrode of the first capacitor is further connected to a positive electrode of the load, to form a second power supply branch to supply power to the load, and the first power supply branch and the second power supply branch are connected in parallel;

wherein each level of each switched-capacitor converter unit comprises a capacitor isolation unit and a switched-capacitor topology, a first terminal of the capacitor isolation unit is a first input terminal of the switched-capacitor converter unit, a second terminal of the capacitor isolation unit is a second input terminal of the switched-capacitor converter unit, an output terminal of the capacitor isolation unit is connected to an input terminal of the switched-capacitor topology, an output terminal of the switched-capacitor topology is an output terminal of the switched-capacitor converter unit, the capacitor isolation unit is configured to isolate the first voltage from the switched-capacitor topology, and an input-output voltage ratio of the switched-capacitor topology is 2:1, such that an input-output voltage average ratio of each level of the switched-capacitor converter unit is 2:1; wherein the output terminal of each level of each switched-capacitor converter unit and the positive electrode of the first capacitor are connected to act as an output terminal of the switched-capacitor converter circuit, and an output voltage of the switched-capacitor converter circuit is Vout; and input terminals of the levels of switched-capacitor converter units are sequentially connected in series; and wherein Vin is equal to (2N+1)Vout.

2. The switched-capacitor converter circuit according to claim 1, wherein the capacitor isolation unit comprises a first switching transistor, a second switching transistor, a third switching transistor, and a second capacitor; wherein a first terminal of the first switching transistor is the first terminal of the capacitor isolation unit, a second terminal of the first switching transistor is connected to a positive electrode of the second capacitor, the positive electrode of the second capacitor is the output terminal of the capacitor isolation unit, and a negative electrode of the second capacitor is connected to a first terminal of the third switching transistor; wherein a first terminal of the second switching transistor is the second terminal of the capacitor isolation unit, a second terminal of the second switching transistor is connected to a common terminal of the third switching transistor and the second capacitor, and a second terminal of the third switching transistor is connected to the ground terminal; and wherein control terminals of the first switching transistor and the second switching transistor receive a first control signal, a control terminal of the third switching transistor receives a second control signal, duty cycles of both the first control signal and the second control signal are preset ratios, and waveforms of the first control signal and the second control signal complement each other.

3. The switched-capacitor converter circuit according to claim 1, wherein the switched-capacitor topology comprises a fourth switching transistor, a fifth switching transistor, a sixth switching transistor, a seventh switching transistor, a third capacitor, and a fourth capacitor; wherein a first terminal of the fourth switching transistor is the input terminal of the switched-capacitor topology, a second terminal of the fourth switching transistor is connected to a first terminal of the fifth switching transistor, a second terminal of the fifth switching transistor is connected to a positive electrode of the fourth capacitor, a negative electrode of the fourth capacitor is connected to the ground terminal, and a positive electrode of the fourth capacitor is the output terminal of the switched-capacitor topology; wherein a positive electrode of the third capacitor is connected to a common terminal of the fourth switching transistor and the fifth switching transistor, a negative electrode of the third capacitor is connected to a first terminal of the sixth switching transistor, and a second terminal of the sixth switching transistor is connected to the ground terminal; wherein a first terminal of the seventh switching transistor is connected to a common terminal of the third capacitor and the sixth switching transistor, and a second terminal of the seventh switching transistor is connected to a second terminal of the fifth switching transistor; and wherein control terminals of the fourth switching transistor and the seventh switching transistor receive the second control signal, control terminals of the fifth switching transistor and the sixth switching transistor receive the first control signal, and waveforms of the first control signal and the second control signal complement each other.

4. The switched-capacitor converter circuit according to claim 1, further comprising an output inductor, wherein one terminal of the output inductor is connected to the output terminal of the switched-capacitor topology, and the other terminal of the output inductor is connected to the positive electrode of the load.

5. The switched-capacitor converter circuit according to claim 1, further comprising an input inductor connected to the first terminal of the capacitor isolation unit, wherein the input inductor is resonant with the first capacitor and the second capacitor.

6. A charging control system of a rechargeable battery, wherein the charging control system is applied to a mobile terminal, and comprises the switched-capacitor converter circuit according to claim 1 and a charging integrated circuit comprising a buck circuit, wherein the load is a rechargeable battery; and an input terminal of the charging integrated circuit is configured to input the first voltage, a first output terminal of the charging integrated circuit is configured to connect to a positive electrode of the rechargeable battery, and a second output terminal of the charging integrated circuit is configured to connect to another circuit in the mobile terminal, wherein the another circuit is a circuit in the mobile terminal that needs power supply, except for the rechargeable battery, wherein when the rechargeable battery is in a constant current charging mode, or when a charging current of the rechargeable battery is less than a preset current value, the switched-capacitor converter circuit is controlled to supply power to the rechargeable battery; or when the rechargeable battery is in a constant voltage charging mode, or when a charging current of the rechargeable battery is greater than or equal to the preset current value, the charging integrated circuit is controlled to supply power to the rechargeable battery.

7. The charging control system according to claim 6, further comprising an eighth switching transistor, wherein a first terminal of the eighth switching transistor is connected to a positive electrode of a voltage source, a second terminal of the eighth switching transistor is connected to a first terminal of the capacitor isolation unit, and the voltage source outputs the first voltage.

8. A charging control system of a rechargeable battery, wherein the charging control system is applied to a mobile terminal, and comprises a charging mode control module and the switched-capacitor converter circuit according to claim 1, wherein the load is a rechargeable battery;

an output terminal of the switched-capacitor converter circuit is further connected to another circuit in the mobile terminal, wherein the another circuit is a circuit in the mobile terminal that needs power supply, except for the rechargeable battery; wherein the charging mode control module comprises a first detection terminal, a second detection terminal, a third detection terminal, a first output terminal, and a second output terminal, wherein the first detection terminal is configured to detect the output voltage of the switched-capacitor converter circuit, the second detection terminal is configured to detect a charging current of the rechargeable battery, and the third detection terminal is configured to detect a voltage of the rechargeable battery; and the first output terminal is connected to a control terminal of a type-1 switching transistor in the switched-capacitor converter circuit, and the second output terminal is connected to a control terminal of a type-2 switching transistor of the switched capacitor circuit, wherein the type-1 switching transistor comprises the first switching transistor, the second switching transistor, the fifth switching transistor, and the sixth switching transistor, and the type-2 switching transistor comprises the third switching transistor, the fourth switching transistor, and the seventh switching transistor.

9. The charging control system according to claim 8, wherein
the charging mode control module is configured to: when detecting, in a constant current charging mode, that the charging current of the rechargeable battery is less than a current threshold, or when detecting, in a constant voltage charging mode, the output voltage of the switched-capacitor converter circuit is less than a voltage threshold, or when detecting, in a trickle charging mode, that the voltage of the rechargeable battery is less than the voltage threshold, output the first control signal through the first output terminal of the charging mode control module, and output the second control signal through the second output terminal of the charging mode control module, to control the switched-capacitor converter circuit.

10. The charging control system according to claim 8, wherein
the charging mode control module is configured to: when detecting, in a constant current charging mode, that the charging current of the rechargeable battery is greater than or equal to the current threshold, or when detecting, in a constant voltage charging mode, that the output voltage of the switched-capacitor converter circuit is greater than or equal to a voltage threshold, or when detecting, in a trickle charging mode, that the voltage of the rechargeable battery is greater than or equal to the voltage threshold, disable the first control signal and the second control signal.

11. A charging control method for a rechargeable battery, applied to a charging control system of a rechargeable battery, wherein the charging control system of a rechargeable battery comprises the switched-capacitor converter circuit according to claim 1 and a charging integrated circuit comprising a buck circuit, wherein the load is a rechargeable battery;
an input terminal of the charging integrated circuit is configured to input the first voltage, a first output terminal of the charging integrated circuit is configured to connect to a positive electrode of the rechargeable battery, and a second output terminal of the charging integrated circuit is configured to connect to another circuit in the mobile terminal, wherein the another circuit is a circuit in a mobile terminal that needs power supply, except for the rechargeable battery, wherein the method comprises:
when the rechargeable battery is in a constant current charging mode, or when a charging current of the rechargeable battery is less than a preset current value, controlling the switched-capacitor converter circuit to supply power to the rechargeable battery; or
when the rechargeable battery is in a constant voltage charging mode, or when a charging current of the rechargeable battery is greater than or equal to the preset current value, controlling the charging integrated circuit to supply power to the rechargeable battery.

12. A charging control method for a rechargeable battery, applied to a charging control system of a rechargeable battery, wherein the charging control system of a rechargeable battery comprises a charging mode control module and the switched-capacitor converter circuit according to claim 1; the load is a rechargeable battery; and the output terminal of the switched-capacitor converter circuit is further connected to another circuit in the mobile terminal, wherein the another circuit is a circuit in the mobile terminal that needs power supply, except for the rechargeable battery; and wherein
the charging mode control module comprises a first detection terminal, a second detection terminal, a third detection terminal, a first output terminal, and a second output terminal, wherein the first detection terminal is configured to detect the output voltage of the switched-capacitor converter circuit, the second detection terminal is configured to detect a charging current of the rechargeable battery, and the third detection terminal is configured to detect a voltage of the rechargeable battery; and the first output terminal is connected to a control terminal of a type-1 switching transistor in the switched-capacitor converter circuit, and the second output terminal is connected to a control terminal of a type-2 switching transistor of the switched capacitor circuit, wherein the type-1 switching transistor comprises the first switching transistor, the second switching transistor, the fifth switching transistor, and the sixth switching transistor, and the type-2 switching transistor comprises the third switching transistor, the fourth switching transistor, and the seventh switching transistor.

13. The charging control method according to claim 12, wherein the method further comprises
when detecting, in a constant current charging mode, that the charging current of the rechargeable battery is less than a current threshold, or when detecting, in a constant voltage charging mode, the output voltage of the switched-capacitor converter circuit is less than a voltage threshold, or when detecting, in a trickle charging mode, that the voltage of the rechargeable battery is less than the voltage threshold, outputting the first control signal through the first output terminal of the charging mode control module, and outputting the second control signal through the second output terminal of the charging mode control module, to control the switched-capacitor converter circuit.

14. The charging control method according to claim 12, wherein the method further comprises
when detecting, in a constant current charging mode, that the charging current of the rechargeable battery is greater than or equal to a current threshold, or when detecting, in a constant voltage charging mode, that the output voltage of the switched-capacitor converter circuit is greater than or equal to a voltage threshold, or when detecting, in a trickle charging mode, that the voltage of the rechargeable battery is greater than or equal to the voltage threshold, disabling the first control signal and the second control signal.

\* \* \* \* \*